United States Patent
Pierce, Jr.

(10) Patent No.: US 7,267,698 B1
(45) Date of Patent: Sep. 11, 2007

(54) METHOD FOR PRODUCING HYDROGEN

(76) Inventor: Joseph Frank Pierce, Jr., P.O. Box 2017, Blue Ridge, GA (US) 30513

(*) Notice: Subject to any disclaimer, the term of this patent is extended or adjusted under 35 U.S.C. 154(b) by 205 days.

(21) Appl. No.: 10/252,462

(22) Filed: Sep. 23, 2002

(51) Int. Cl.
*C01J 3/68* (2006.01)

(52) U.S. Cl. ............ 48/198 FM; 48/61; 48/62 R; 48/77; 48/89; 48/101; 48/111; 48/92; 48/198.2; 48/119; 48/209; 48/210; 422/186; 588/205

(58) Field of Classification Search .......... 48/61, 48/62 R, 77, 89, 101, 111, 92, 198.2, 119, 48/209–210, 197 FM; 422/186; 588/205
See application file for complete search history.

(56) References Cited

U.S. PATENT DOCUMENTS

| | | | |
|---|---|---|---|
| 3,841,239 A * | 10/1974 | Nakamura et al. | 110/342 |
| 3,868,817 A | 3/1975 | Marion et al. | 60/39.02 |
| 4,181,504 A | 1/1980 | Camacho | |
| 4,202,167 A | 5/1980 | Suggitt et al. | 60/39.02 |
| 4,326,842 A * | 4/1982 | Adachi et al. | 425/10 |
| 4,341,915 A * | 7/1982 | Adachi et al. | 373/22 |
| 4,831,944 A * | 5/1989 | Durand et al. | 110/346 |
| 4,845,942 A | 7/1989 | Schemenau et al. | 60/39.12 |
| 5,146,755 A | 9/1992 | Abdelmalek | 60/655 |
| 5,280,757 A * | 1/1994 | Carter et al. | 110/346 |
| 5,507,141 A | 4/1996 | Stigsson | 60/39.05 |
| 5,534,659 A | 7/1996 | Springer et al. | |
| 5,666,891 A | 9/1997 | Titus et al. | 110/250 |
| 6,066,825 A | 5/2000 | Titus et al. | |
| 6,182,584 B1 | 2/2001 | Gaudio | 110/229 |
| 6,551,563 B1 | 4/2003 | Kado et al. | |
| 6,810,821 B2 | 11/2004 | Chan | |
| 6,818,335 B2 | 11/2004 | Edlund et al. | |

OTHER PUBLICATIONS

"Evaluation of Plasma Arc Technology for the Treatment of Municipal Solid Wastes In Georgia," Jan. 1997.

* cited by examiner

*Primary Examiner*—Glenn Caldarola
*Assistant Examiner*—Vinit H Patel
(74) *Attorney, Agent, or Firm*—King & Spalding LLP

(57) ABSTRACT

The invention is a method for producing hydrogen using a generator, heating the vessel that is part of the generator, loading waste comprising steel into the heated vessel, melting the loaded waste to a molten state using a non-transferred torch to cut and melt the waste and then using a transferred torch to maintain a molten metal pool, adding additional steel to raise the molten metal pool to a minimum depth, raising the temperature to 2000 degrees Centigrade, acquiring EPA approval, loading waste into the vessel at a defined rate, maintaining the molten metal pool further melting any non-melted waste into a molten status with the transferred torch, determining BTU content and gas flow, injecting steam into the vessel, flowing gas from the vessel through scrubbers into storage containers and collecting the hydrogen in a collection vessel.

7 Claims, 11 Drawing Sheets

METHOD FOR PRODUCING HYDROGEN

FIELD OF THE INVENTION

The present invention concerns a method for producing hydrogen using a fuel gas generator system.

BACKGROUND OF THE INVENTION

The invention concerns a method for using a uniquely designed two-nozzle plasma generator which utilizes two plasma arc torches, a non-transferred torch and a transferred torch to create a molten pool from waste in a vessel, the introduction of steam into the vessel, and the generation of hydrogen gas that ultimately runs steam boilers to generate electricity.

This method can be used in particular for treatment of waste to obtain electricity and for obtaining hydrogen gas. It can be used with municipal waste, tires medical waste and hazardous waste to generate electricity.

Four-nozzle plasma generators are known. Methods to use them for cutting and melting items are known. Four-nozzle plasma generators are typically made of two anode and two electrode chambers connected to a DC power sources. The four-nozzle plasma generators create plasma jets whose shape and trajectory are typically dictated by an external magnetic field system. These types of plasma generators are known to be expensive and a need has existed for a less expensive device that can also produce electricity. A four-nozzle plasma generator is described in the document entitled *Basis For Implementation Of The Method For Dynamic Plasma Treatment Of The Surface Of A Solid Body*, P. P. Koulik et al., Plasmochimie 87" Part 2, Moscow, 1987, pp. 58 to 96.

The construction of the electrode chambers (anode and cathode) for a plasma generator is described in the document entitled *Twin Jet Plasmatron*, I. I. Genbaiev, V. S. Enguelsht, Frounze, 1983.

A need had existed for a low cost two-nozzle generator with a specific configuration enables efficient introduction of plasma to municipal waste, or medical waste to melt the waste and ultimately produce hydrogen gas.

A need has long existed for a generator that heats waste with plasma jets and, in the absence of cooled walls, offers high performance in output of hydrogen gas.

The generation of plasma jets and streams are often accompanied by toroidal vortices. The resulting flow of hot gas heats parts of the electrode chambers causes substantial heat losses by thus reducing the generator efficiency. On the other hand, when the degree of turbulence of the plasma stream is increased, there is a loss of products introduced into the central zone of the stream generating harmful secondary effects in terms of the service life of the generator because these products precipitate on the surface of the electrode chambers and the supply elements. Plasma radiation, which is particularly high when chemical products are introduced into the plasma stream, is also a cause of superfluous heating of the various parts of the generator exposed to this radiation. A need has existed from a stable, preferably portable or at least modular, generator that uses little or no water to treat waste and generate usable product.

In addition to the generator itself, there is a need for a system and methods to produce hydrogen. A need also has existed for efficient feeding systems for the high-energy fuel gas generator.

SUMMARY OF THE INVENTION

The invention relates to method for producing hydrogen using a fuel gas generator system.

The generator of the method is a vessel having a front, a back, a bottom, a first side, a second side, a third side, and a feed ramp. A first plasma arc torch known as a moveable non-transferred torch is disposed in at least one side of the vessel for contacting waste that is fed into the chamber such as through an automatic feeding system. With the introduction and melting of the waste, particularly tires, a pool of molten material is formed. A second plasma arc torch is disposed behind and aligned with the first plasma arc torch, however the second torch is a moveable transferred torch and it is used for contacting the molten material and keeping it molten.

At least one steam injector is disposed in at least one side of the vessel for keeping molten material off the sides of the vessel and for adding water to the system. The introduction of water causes the formation of hydrogen gas by the plasma generators and through the heat of the molten pool. At least one molten material outlet is disposed in the back of the vessel for removing molten material. At least one gas outlet is disposed in the vessel for removing gas from the vessel to first a dry scrubber and then to a wet scrubber.

BRIEF DESCRIPTION OF THE DRAWINGS

The present invention will be explained in greater detail with reference to the appended figures, in which.

DETAILED DESCRIPTION OF THE PREFERRED EMBODIMENTS

Before explaining the present invention in detail, it is to be understood that the invention is not limited to the particular embodiments and that it can be practiced or carried out in various ways.

The method of the invention has as benefits, no fuel costs because the method uses waste. It also has as a benefit, the reduction of waste going to landfills, including but not limited to tires and medical waste, including needles, and other material that is a mix of metal, hazardous waste and special waste as classified by the EPA.

The method of the invention has additional benefits, that of using a closed vessel which, instead of "burning" the waste causing pollution, like an incinerator, instead does not cause any additional atmospheric pollution.

The present invention also has as a benefit a lower cost per kilowatt-hour produced because the source of the fuel for the generator is lower than that for fossil fuels.

The present invention enables a generator to be running in 12 months rather than 5 to 7 years. And the method has the generator permitted quickly as a gasification unit.

Another benefit of the method is that no bottom ash or fly ash is created, no smoke stacks are used, no gassing off occurs as with traditional electricity generation methods.

This method is very flexible because it can process any organic or inorganic compound and is less expensive to build than oil driven turbines because it can use recycled steam turbines to create the electricity.

Figure 1:
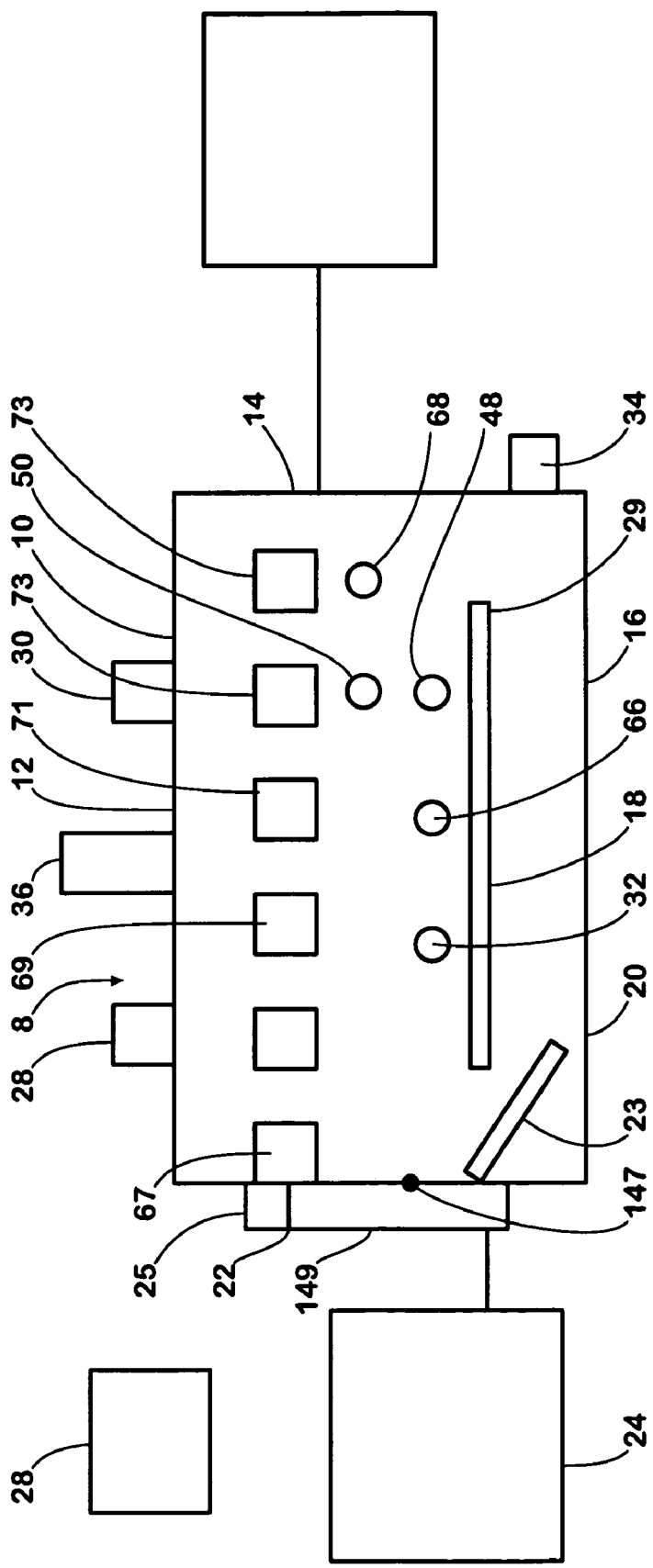
FIG. 1 is a side view of the generator.
Figure 2:
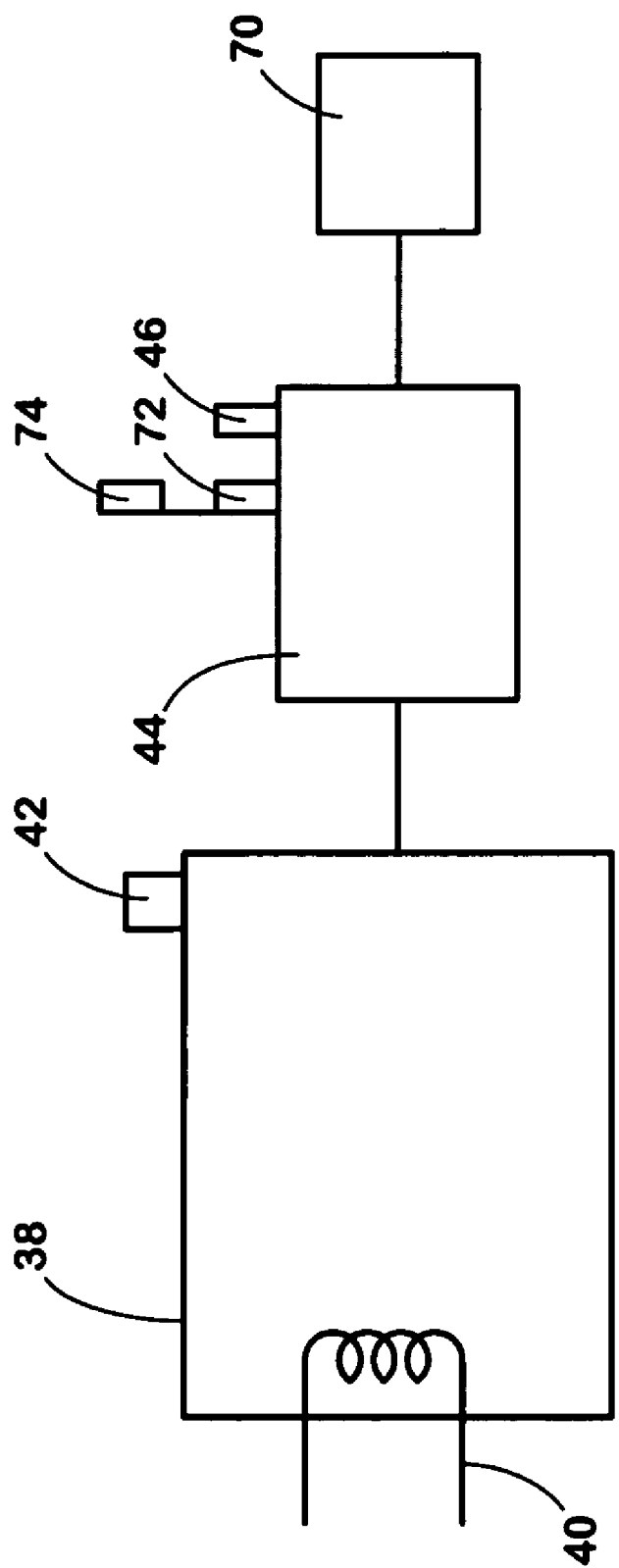
FIG. 2 is a side view of the dry scrubber usable in the invention.

The invention is a method that uses a particular generator which is shown in more detail in FIG. 1 and FIG. 2, wherein the generator system (8) is shown having a vessel (10) with a front (12), a back (14), a bottom (16), a first side (18) a second side (20) a third side (22) and a feed ramp (23) that communicates with a sealable opening (25).

The feed ramp is used to provide the waste material into the vessel, such as by rolling or by sliding into the container from a feed system. An optional feed system, such as an automatic feed system (24) could be used within the scope of the generator system.

Figure 3:
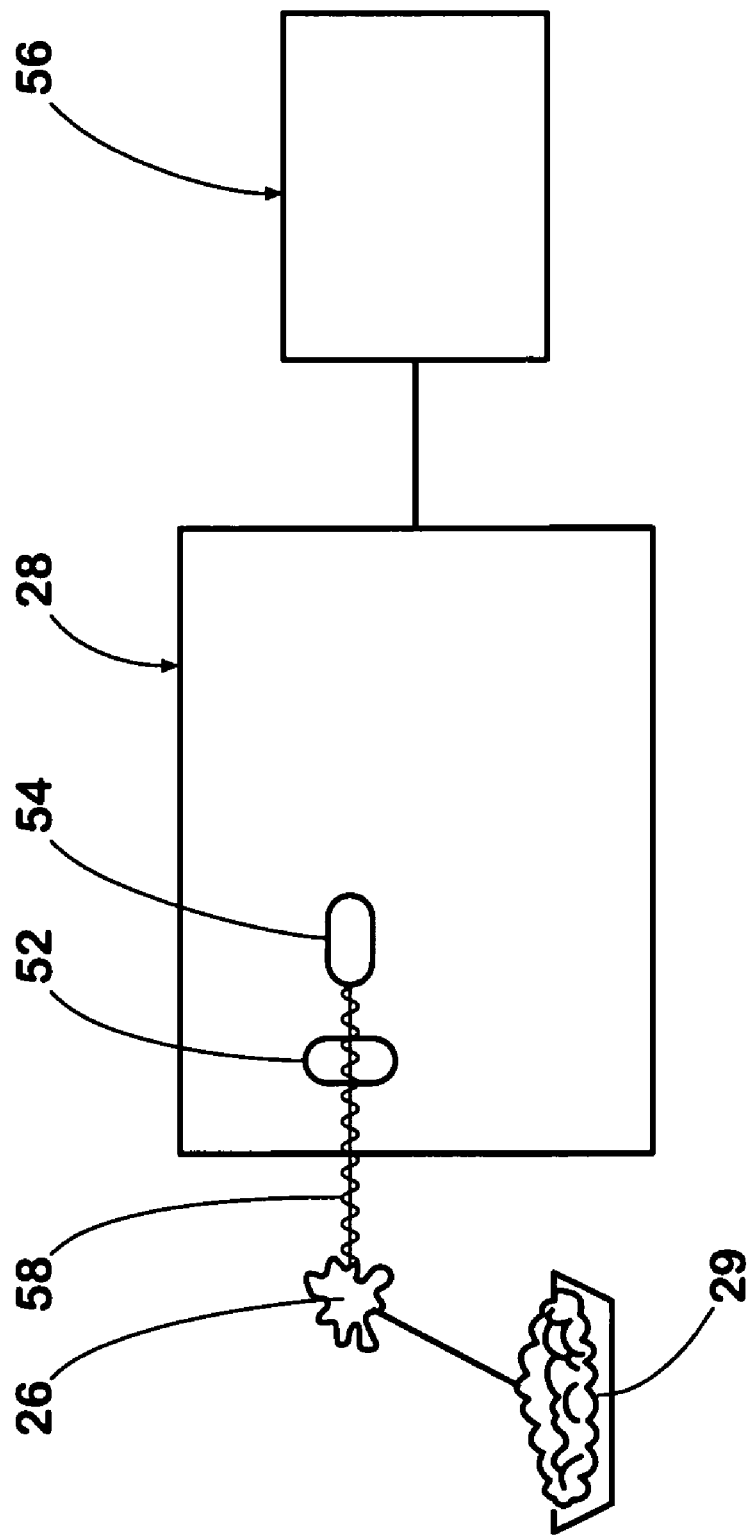
FIG. 3 is a side view of the non-transferred torch usable in the invention.
Figure 4:
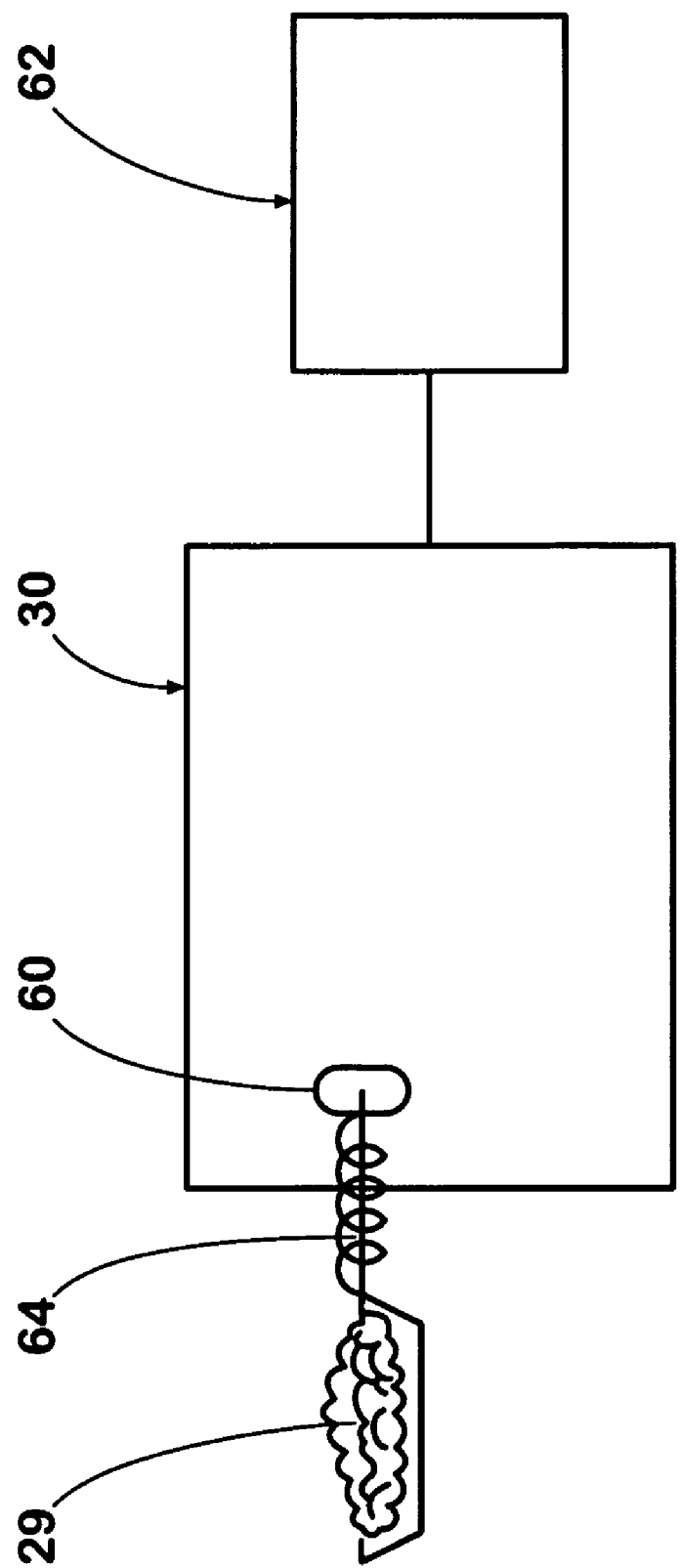
FIG. 4 is a side view of the transferred torch.

The vessel (10) contains at least two plasma arc torches that are shown in more detail in FIGS. 3 and 4.

FIG. 3 shows the moveable non-transferred torch (28) that is disposed in at least one side of vessel (10) for contacting waste (26) and creating molten material (29).

FIG. 4 shows the second plasma arc torch that is disposed in vessel (10), wherein the second torch is termed a moveable transferred torch (30) and this torch is used for contacting the molten material (29). The two plasma arc torches can be disposed in the same side or top of the vessel, or they could be disposed on opposite sides. Preferably each torch is pivotable and rotatable and swivel able. Additionally, in a preferred embodiment, the first torch points at the waste material as it goes down the ramp and the second plasma arc torch points at the molten pool created in the bottom of the vessel by the first torch, keeping the pool hot and further melting any additional waste which is not yet melted.

Figure 5:
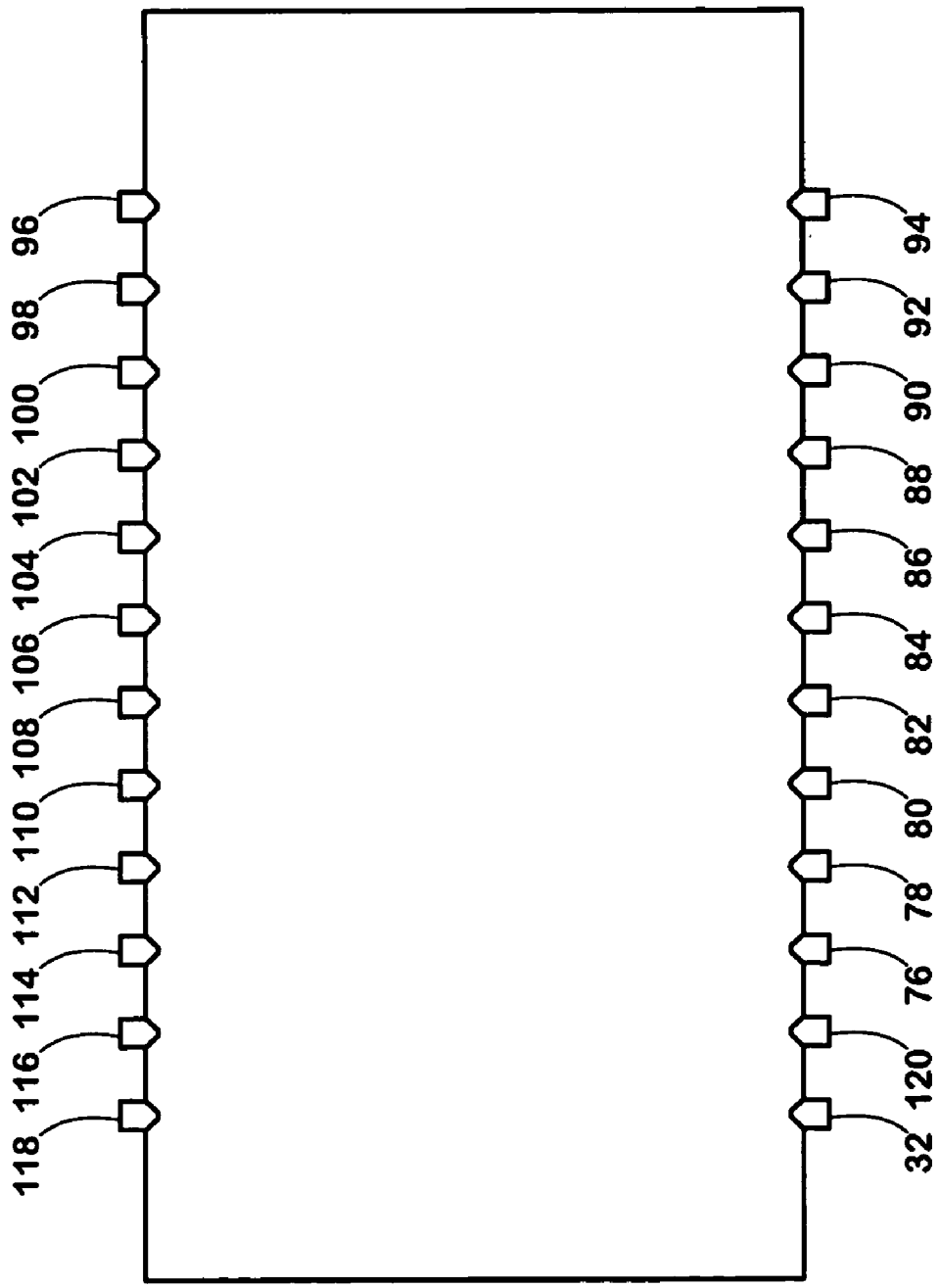
FIG. 5 is a top view of the vessel of the invention with 24 steam injectors.

Returning to FIG. 1 and FIG. 2, at least one steam injector (32) is disposed in at least one side of vessel (10). In another embodiment, two steam injectors are used, and as shown in a later FIG. 5, a vast plurality of steam injectors are used, which not only introduce water and steam into the system to keep the molten material moving, but provide a source of hydrogen, as attached to oxygen, which is separated from the oxygen during the heating process. The generator of claim 1, wherein said steam injector (32) has an outer diameter between 1 inch and 6 inches. Note that FIG. 5 shows that between 4 and 24 steam injectors can be used in the vessel, with 2-12 steam injectors being disposed on sides opposite each other.

At least one molten material outlet (34) is disposed in the back of the vessel (10) for removing molten steel, or other molten metal to form bars.

At least one gas outlet (36) is disposed in one side, such as the third side (22) of the vessel (10) (shown in FIG. 2, in particular) for transferring gas from the vessel (10) to a dry scrubber (38). It is contemplated that the dry scrubber has a dry scrubber outlet (42) for removing treated gas.

The dry scrubber is connected to a wet scrubber (44) at the dry scrubber outlet (42) for receiving gas from the dry scrubber, and further scrubbing the treated gas and passing the twice treated gas to a wet scrubber outlet (46).

It is also contemplated, as shown in FIG. 1, that the generator system can include a hydrocarbon injector (48) disposed in at least one side of the vessel for injecting into the waste: oil, other hydrocarbons sewage, sludge or combinations thereof, into the vessel for treatment along with the waste.

FIG. 1 also shows an optional gas BTU enhancer port (66) for inputting a BTU enhancing material (68) to the vessel to increase the BTU ratings of the gas from the gas outlet. It is contemplated that the BTU enhancer material is a calcium carbonate material. Lime is also considered a usable BTU enhancer for this generator system.

Looking again at FIG. 2, it is shown that one embodiment contemplates that the dry scrubber (38) can further comprises a heat exchanger (40) for removing heat from the gas as it passes through the dry scrubber. Additionally shown in FIG. 2 is that the wet scrubber outlet (46) can optimally be connected to a storage tank (70). Further optional considerations include that the wet scrubber can be connected to a wet scrubber flare outlet (72) connected to a flare (74).

Once again returning to FIG. 1, it is shown that the generator system comprises an oxygen injector port (50) disposed in at least one side of the vessel for injecting oxygen into the vessel. The oxygen used in this injector point may be liquid oxygen or oxygen gas.

As to the specifics of the vessel design for the generator system, it is contemplated that the feed ramp can have an angle of inclination between 30-50 degrees between the feed system and the molten material, and more preferably between 30-40 degrees, most preferably the angle of inclination of the feed ramp is 40 degrees between the feed system and the molten material.

It is also contemplated that the sides, front and bottom of the vessel are welded together. These components are contemplated to comprise a 1-inch thick metal alloy. The metal alloy can comprise a member of the group: carbon steel and its alloys, stainless steel and its alloys, titanium and its alloys, and combinations thereof.

Overall, the vessel is contemplated to have a height between 12 feet and 400 feet, and a length between 10 feet and 400 feet, and a width of between 5 feet and 400 feet. More preferably, the generator has a height between 12 feet and 18 feet, and a length between 10 feet and 30 feet, and a width of between 5 feet and 14 feet.

FIG. 3 provides details on the moveable non-transferred torch (28). This torch has an anode (52) and cathode (54) connected to a power supply (56) for creating an arc (58) to contact with the waste (26) in the vessel (10). The non-transferred torch is adapted to be rotatable to 180 degrees, and adapted to be vertically moveable in the vessel. Preferably, the non-transferred torch is a 2-megawatt, water-cooled torch. It is also contemplated that the non-transferred torch is further adapted to be moveable horizontally.

The power supply is contemplated to be a DC-power supply for the torch.

FIG. 4 shows the moveable transferred torch (30) has an transferred torch anode (60) connected to a transferred torch power supply (62) for creating a transferred torch arc (64) to contact with the molten material (29) in the vessel and the transferred torch is adapted to be rotatable to 180 degrees, and adapted to be vertically moveable in the vessel. This transferred torch is contemplated to be a 2-megawatt, water-cooled torch. It is also contemplated that this transferred torch is further adapted to be moveable horizontally. The transferred torch power supply could be a DC-power supply.

The waste treatable in the system can be a member from the EPA category of MUNICIPAL SOLID WASTE, SPECIAL WASTE comprising tires and medical waste or HAZARDOUS WASTE or combinations thereof.

The molten material for the generator is contemplated to be steel, carbon or combinations thereof. The molten material outlet (34) preferably has an outer diameter between 2 inches and 6 inches.

In one embodiment, the gas outlet has an outer diameter between 4 and 6 inches and is externally cooled, such as water-cooled.

It is also contemplated that the vessel has at least five insulating walls disposed adjacent the sides of the vessel as shown in FIG. 1, elements (65), (67), (69), (71) and (73). These insulating walls preferably comprise a non-stick refractory material, such as ruby brick refractory material.

FIG. 5 shows the four to twenty-four steam injectors disposed in the vessel (76, 78, 80, 82, 84, 86, 88, 90, 92, 94, 96, 98, 100, 102, 104, 106, 108, 110, 112, 114, 116, 118, 120, 122). The novel feed system for this generator system of this invention is shown in more detail in FIG. 6, FIG. 7, FIG. 8, and FIG. 9. The steam injectors can be between 1½ feet and 3 feet above the molten metal pool.

Figure 6:
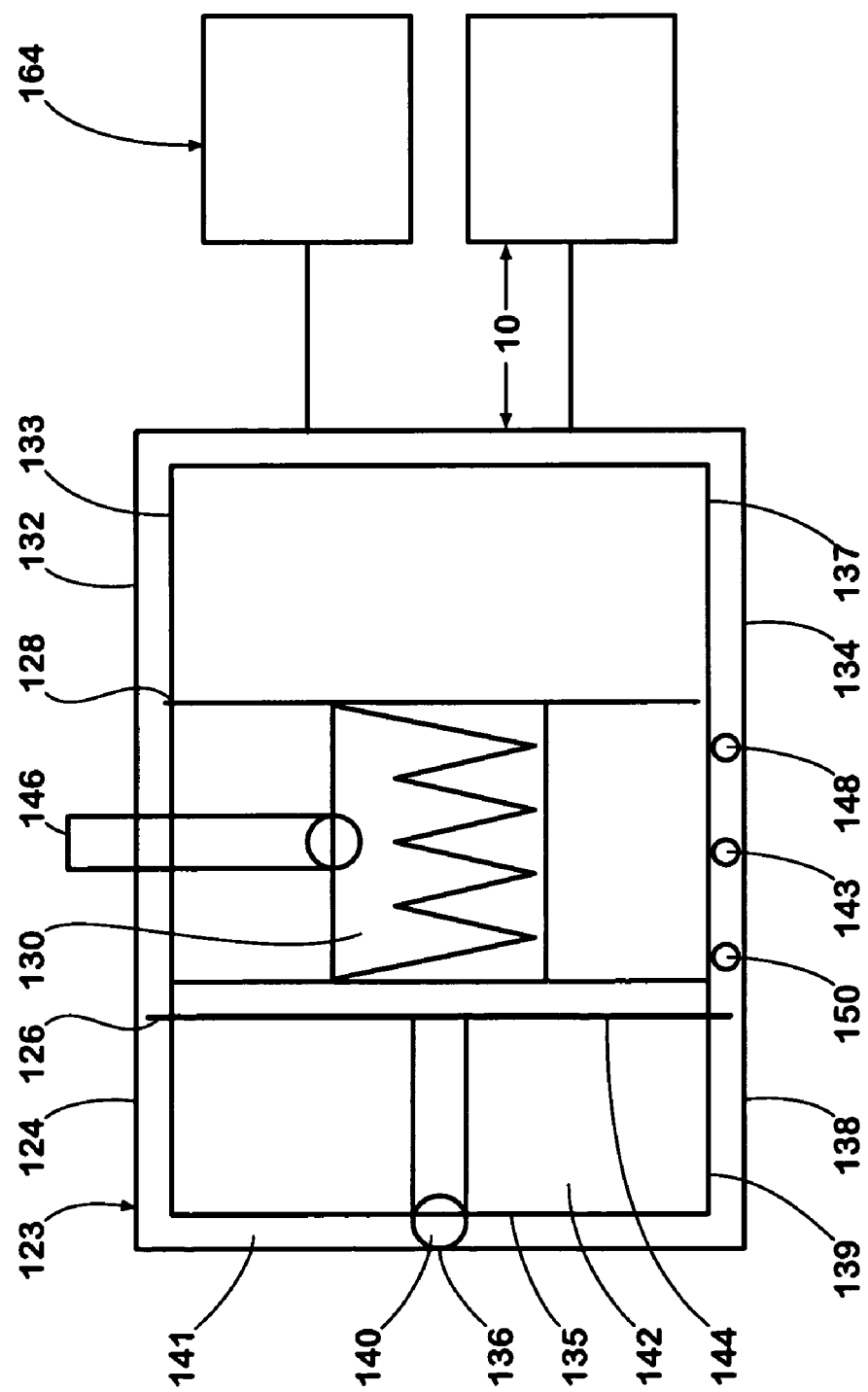
FIG. 6 is a top view of the feed system according to the invention in a position where waste is about to be loaded into the chamber.
Figure 7:
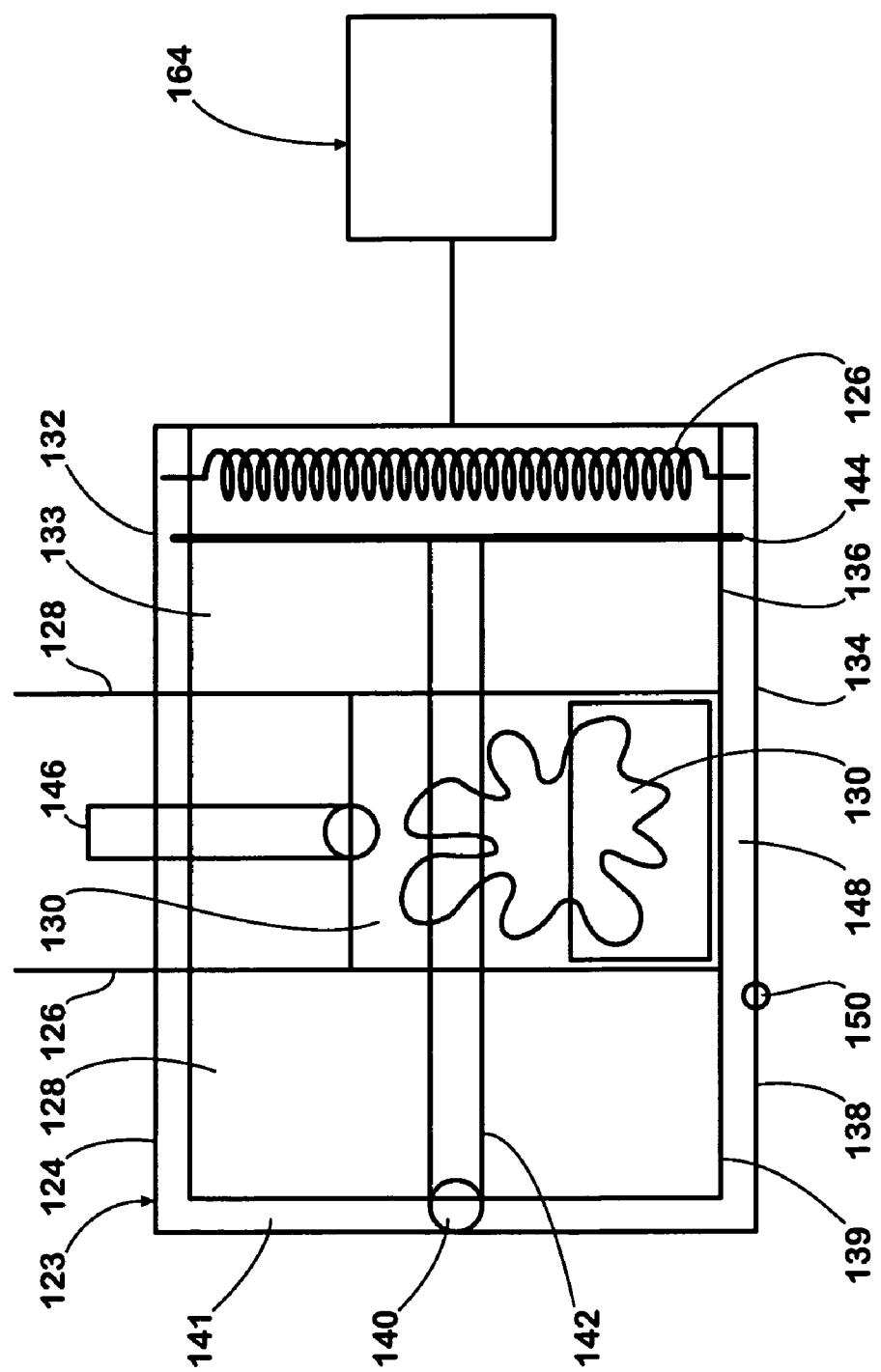
FIG. 7 is a top view of the feed system wherein waste has just been expelled from the chamber.

In FIG. 6 and FIG. 7, the feed system has a sealable double walled container (123) with an outer top side (124) and an inner top side (125). The outer top side (124) has a first rail (126) a second rail (128) and a door (130) for slidable engaging the first and second rails. The double walled container (123) has an outer first container side (132), an inner first container side (133), a outer second container side (134), an inner second container side (135), an outer container back (136), an inner container back (137), a outer container bottom (138), and an inner container bottom (139).

FIG. 6 and FIG. 7 also shows the container outer and inner backs further each have a hole disposed in them. The container outer back has an outer back hole (140). The container inner back has an inner back hole (141). The holes are aligned to permit a piston (142) to slide through the holed. The double wall container forms a space between one-half inch to 2-inches connected to the vessel of the generator.

The piston (142) penetrates the holes (140) and (141), as shown in FIG. 6 and FIG. 7. The piston is connected to a plate (144) on one end. The plate slides in the container (122) forming a surface against which to push the waste bales or loose waste material. The piston (142) is connected to the sealable opening locks to unlock all locks and to apply pressure such that the plate can be retracted to a position against the back (136) revealing or essentially forming a loading chamber (148) to permit loading of waste (26) into the loading chamber.

At least two spring loaded door locks (143 and 145) connect to the topside. Each door lock is adjacent to the door for locking the door in a closed position. At least two spring-loaded sealing locks (147 and 149) are mounted on the vessel for locking the sealable opening, such as in a closed position.

A second piston (146) is connected to the door locks to unlock and retract the door for loading waste.

At least one inert gas injector (150) is mounted to at least one side or to the bottom of the container for flooding the loading chamber with inert gas, which assists in the movement of the gas and increases safety of the system to prevent "back burning" of fire from the generator as the waste is loaded into the chamber. This inert gas insertion technique into the loading chamber of the automatic feeding system (24) (See FIG. 1) is a significant and key advantage of the system from a safety and quick and efficient handling perspective.

Additionally, a liquid cooling system (152) is disposed in the space created by the double walls of the container to keep the feeding system cool and safe to work with for the operators and owner of the generator.

Figure 8:
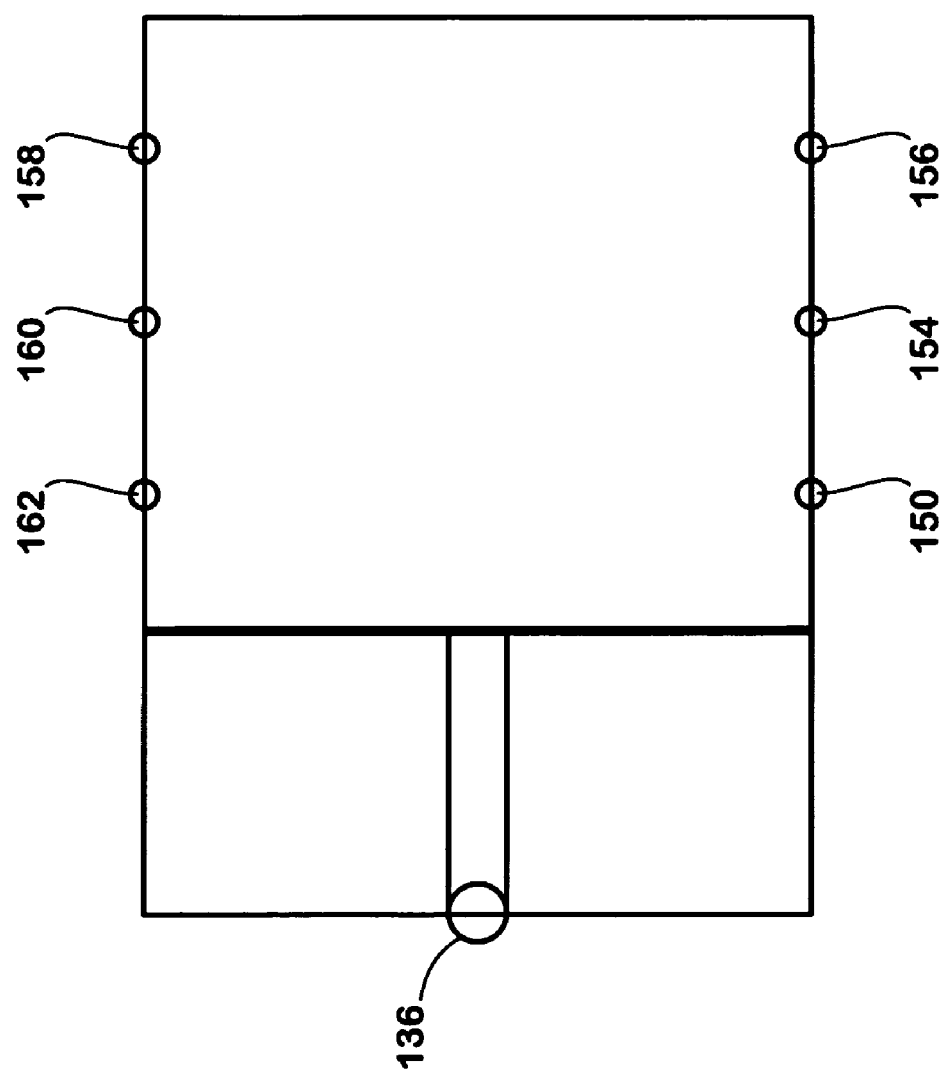
FIG. 8 is a top view of the container of the feed system with 6 inert gas injector ports.

FIG. 8 shows the inert gas injectors (150, 154, 156, 158, 160, 162) disposed on the back (136) of the piston.

Figure 9:
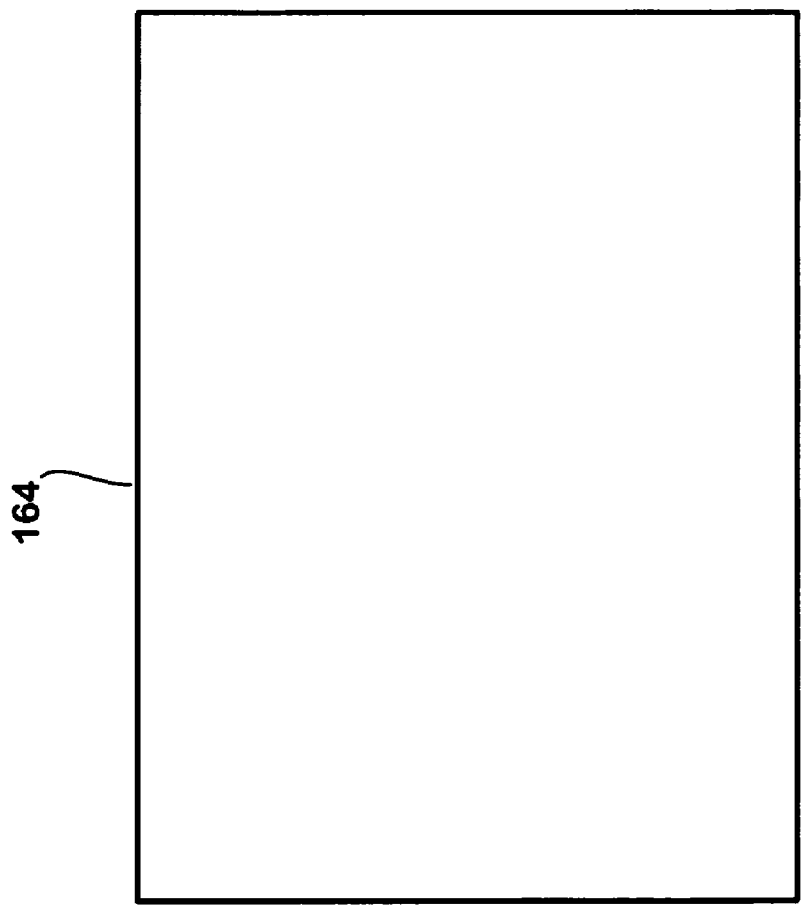
FIG. 9 is a top view of the feed system having a controller.

FIG. 9 shows the controller (164) that is used for operating the locks, door and sealable opening of the feeding system.

In a preferred embodiment, the liquid cooling system uses water as the cooling carrier.

In another preferred embodiment the feeding system can utilize at least one pneumatic piston, or a hydraulic piston or a mechanical piston as at least one of the pistons of the system. It is contemplated that a combination of these types of pistons could be used and controlled by the controller (164).

In a preferred embodiment, it is contemplated that for the feed system the sealable opening of the vessel is a locking sliding door. The locks of the system, such as for the sliding door are contemplated as being hydraulic locks and operable by the same controller (164) or by an independent controller.

In still another embodiment, it is contemplated that the feed system the door and the sealable opening are hydraulically actuated.

For the gas injectors mounted in the container, it is contemplated that at least two could be used, one on each side of the container and the inert gas that they inject could be nitrogen, argon, helium, carbon dioxide or combinations thereof.

In still another embodiment of the feed system it is contemplated that the container top side, first rail, second rail, door, first container side, second container side, container back, container bottom are all made from an at least one-inch thick metal alloy, such as carbon steel and its alloys, stainless steel and its alloys, titanium and its alloys, or combinations thereof.

As to dimensions of the feed system, it is contemplated that the plate has dimensions of 30-inches by 50-inches by 60-inches and the plate has a thickness between one-half inch and 2-inches. The plate could be made from a flame sprayed coating disposed on all sides of the plate, and this coating could be a ceramic coating, such as one capable of resisting heat up to 12,000 degrees Celsius. The piston is preferably connected to the plate at the center of the plate and the piston has an overall length from between 10 and 400 feet. In one embodiment, the piston is a solid rod.

As to size, the feed system container preferably has an outside height between 12 feet and 400 feet, a length between 10 feet and 400 feet, and a width between 5 feet and 400 feet. More preferably the feed system container has a height between 12 feet and 18 feet, a length between 10 feet and 30 feet, and a width of between 5 feet and 14 feet It is contemplated that the waste for use in the feed system is either EPA category of MUNICIPAL SOLID WASTE, SPECIAL WASTE including tires and medical waste, or HAZARDOUS WASTE.

It is contemplated that for the feed system the controller is a computer based electro-mechanical device for controlling the pistons The inventive method for converting waste into hydrogen using the plasma generator described above.

Figure 10:
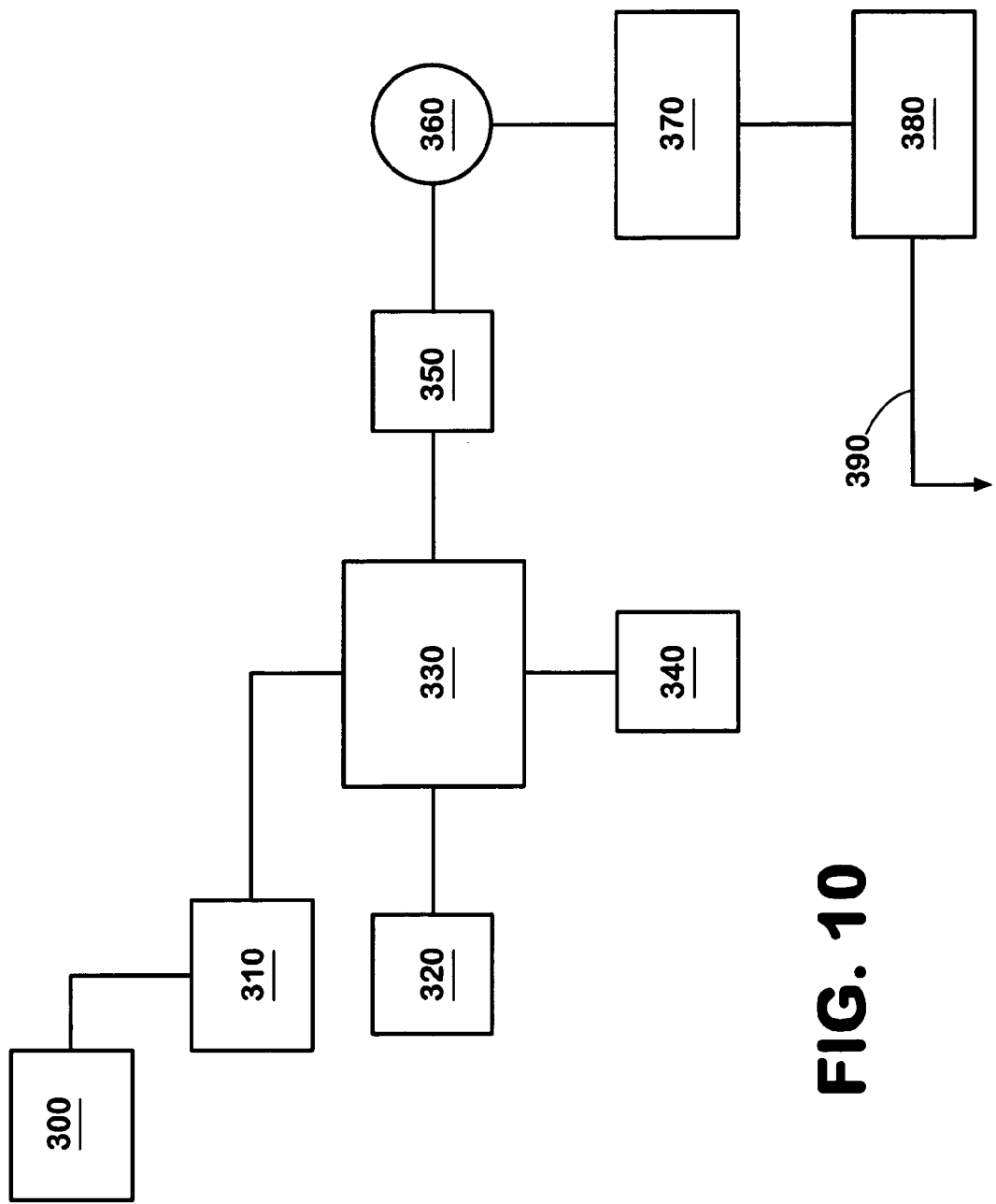
FIG. 10 is a diagram of the method for start up of the generator from an electrical power grid substation that is an independent power source.

Referring to FIG. 10 the method involves the steps that start with obtaining scrap metal and inserting scrap metal into a vessel. The figure is representative of the method by showing the electrical substation (300), the power supply (310), the scrap metal (320), the gas generator (330), the steam source (340), the scrubber system (350), the gas storage tank (360), the steam boilers (370), the steam generators (380), and the flow to the power grid (390).

The next step shown in FIG. 10 is the pre-heating of the vessel using electricity from an electrical substation to a power supply that then heat the vessel. The loaded waste comprising steel is melted in the vessel as it is heated. Preferably the loaded waste has steel, such as steel belted tires and the steel is cut by the plasma arc torch and melted to a molten state in the vessel.

The method involves first using the non-transferred plasma arc torch to cut and melt the waste and then using the second transferred plasma arc torch to maintain the liquid state of the waste, creating a molten metal pool. Next, 4 tons of steel are added to the heated vessel creating a molten metal pool with a minimum operating depth Next the heated vessel is heated further to an operating temperature of at least 2000 degrees Centigrade.

EPA category MUNICIPAL SOLID WASTE, HAZARDOUS WASTE and/or SPECIAL WASTE is then load into the heated vessel. Preferably, the waste is loaded at a defined rate per hour.

Next the waste is transformed into molten material with the non-transferred torch by cutting and heating.

After the first torch cuts and heats the molten material, the second torch maintains the molten material status of the waste by further melting any non-melted waste into a molten status The next step involves determining BTU content and gas flow from the generator using conventional test techniques.

Following the testing for BTU content, steam is injected into the vessel from a steam source. Gas, hydrogen gas, is then flowed from the vessel through the scrubber system shown in FIG. 10. The scrubber system consists of first a dry scrubber and then a wet scrubber. After scrubbing the gas is passed into gas storage tanks or similar storage containers. Gas is then passed from the storage containers to at least one steam boiler. The hydrogen is used to heat the steam boiler to produce steam to run at least one steam generator or steam turbine to generate electricity at a capacity up to 50 megawatts. Up to 6 steam turbines and 6 steam boilers are contemplated as usable in this method. The power generated from the steam generators is then passed out to sources needing power, such as a power grid.

It is noted that a preferred embodiment of this method involves loading waste into the vessel at a rate of 4 bales per hour, with each bale of waste weighing 2000 pounds.

In another embodiment, it is contemplated that prior to heating the vessel, four tons of steel are loaded into the vessel to create a minimum operating depth of molten material.

In an embodiment of the invention it is contemplated that waste is loaded in bales of 2000 pounds per hour. When bales are used, it is contemplated that the first plasma arc torch of the vessel cuts the bales and transforms the waste into molten material.

The inventive method contemplates that the BTU content and gas flow data is determined by taking gas samples.

In the most preferred embodiment, gas is passed from the vessel through the dry and wet scrubbers and into storage containers at a rate of 90000 cubic feet per 2000 pounds of waste.

Figure 11:
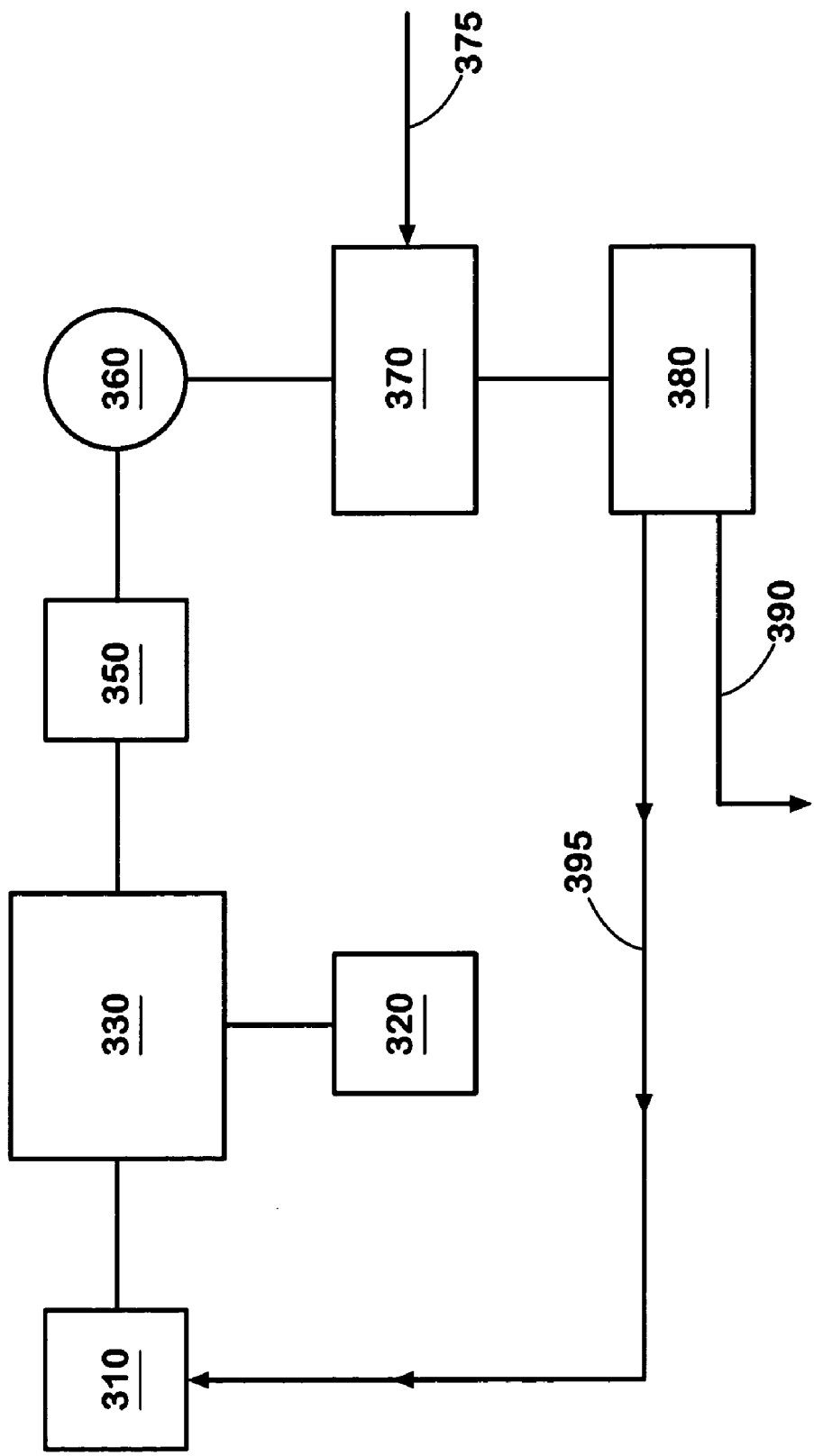
FIG. 11 is a diagram of the method for start up by the use of natural gas and power from the generator of the invention.

A second embodiment of the start up method is shown in FIG. 11. In this method, the scrap metal is loaded in the vessel as in the method of FIG. 10. FIG. 11 represents the method by showing the power supply (310), the scrap metal (320), the gas generator (330), the scrubber system (350), the gas storage tank (360), the steam boilers (370), the flow the natural gas supply (375), the steam generators (380), the flow to the power grid (390), and the flow of the back feed to the power supply (395).

The vessel is heated from a power supply. The generator produces the necessary gas in the method described above and the gas is scrubbed in a scrubber system. The gas is then flowed to gas storage tanks and to a steam boiler. The steam boiler can be initially started up using a natural gas supply to produce power. The steam from the boilers is then sent to the steam generators to create power. The power is then fed out to the grid and to the power supply for additional start up or for supplying power to the plasma arc torches to keep the method, cheap, using recycled materials, and some power produced by the process.

The invention also includes a hydrogen storage vessel connected to the wet scrubber outlet. The hydrogen storage vessel collects the hydrogen gas produced from the invention's method.

While this invention has been described with emphasis on the preferred embodiments, it should be understood that within the scope of the appended claims, the invention might be practiced other than as specifically described herein.

What is claimed is:

1. A method for producing hydrogen using a generator
   a. wherein the generator comprises
   i. a vessel having a front side, a back side, bottom side, a first side, a second side, a third side, and a feed ramp;
   ii. a feed system with a sealable opening disposed in the front for supplying waste to the vessel;
   iii. a moveable non-transferred torch disposed in at least one side of said vessel for contacting said waste creating molten material;
   iv. a moveable transferred torch for contacting the molten material wherein the transferred torch is disposed in at least one side of said vessel;
   v. at least one steam 'injector disposed in at least one side of said vessel;
   vi. at least one molten material outlet disposed in the back of said vessel;
   vii. at least one gas outlet disposed in the third side of the vessel for transferring gas from the vessel to a dry scrubber wherein said dry scrubber further has a dry scrubber outlet;
   viii. a wet scrubber connected to the dry scrubber outlet for receiving gas from the dry scrubber, and further scrubbing said gas and passing said gas to a wet scrubber outlet;
   ix. a hydrogen storage vessel connected to the wet scrubber outlet;
   b. heating the vessel;
   c. loading waste comprising steel into the heated vessel;
   d. melting the loaded waste comprising steel to a molten state in the vessel by first using a non-transferred torch to cut and melt the waste and then using a second transferred torch to maintain the liquid state of the waste creating a molten metal pool;
   e. adding an additional 4 tons of steel to the heated vessel creating a molten metal pool with a minimum operating depth;
   f. raising the heated vessel temperature to an operating temperature of at least 2000 degrees Centigrade;

g. acquiring EPA category MUNICIPAL SOLID WASTE, HAZARDOUS WASTE and/or SPECIAL WASTE to load into the vessel;
h. loading said waste into the vessel at a defined rate per hour;
i. transforming the waste into molten material with the non-transferred torch by cutting and heating said waste;
j. maintaining the molten material status of the waste by further melting any non-melted waste into a molten status with the transferred torch;
k. determining BTU content and gas flow;
l. injecting steam into the vessel;
m. flowing gas from the vessel through the dry and wet scrubbers and into storage containers; and
n. collecting the gas in the hydrogen storage vessel.

2. The method of claim 1, wherein waste is loaded into the vessel at a rate of 8000 pounds per hour.

3. The method of claim 1, wherein, at start-up, four tons of steel are loaded into the vessel to create a molten metal pool with a minimum operating depth.

4. The method of claim 1, wherein the waste is loaded in bales of 2000 pounds at a rate of 4 bales per hour and the first torch of the vessel cuts the bales and transforms the waste into molten material.

5. The method of claim 1, wherein said BTU content and gas flow data is determined by taking gas samples.

6. The method of claim 1, wherein gas is flowed from the vessel through the dry and wet scrubbers and into storage containers at a rate of 90000 cubic feet per 2000 pounds of waste.

7. The method of claim 1, wherein the steam injectors are between 1-½ feet and 3 feet above the molten metal pool.

* * * * *